United States Patent
Sands et al.

(10) Patent No.: US 7,264,746 B2
(45) Date of Patent: Sep. 4, 2007

(54) UREA BASED GRANULE BLEND FOR ICE-MELTING AND REDUCING GRANULE CAKING

(75) Inventors: Robert M. Sands, Batley (GB); Lawrence N. Tomlinson, Batley (GB)

(73) Assignee: Basic Solutions Limited, Batley (GB)

( * ) Notice: Subject to any disclaimer, the term of this patent is extended or adjusted under 35 U.S.C. 154(b) by 538 days.

(21) Appl. No.: 10/686,397

(22) Filed: Oct. 14, 2003

(65) Prior Publication Data

US 2004/0124395 A1 Jul. 1, 2004

(30) Foreign Application Priority Data

Oct. 18, 2002 (GB) .................................. 0224240.2

(51) Int. Cl.
*C09K 3/18* (2006.01)
*B65D 83/06* (2006.01)

(52) U.S. Cl. .............................. 252/70; 106/13; 221/1; 222/1; 222/196.1

(58) Field of Classification Search .................. 252/70; 106/13; 221/1; 222/1, 196.1
See application file for complete search history.

(56) References Cited

U.S. PATENT DOCUMENTS

| | | | | |
|---|---|---|---|---|
| 3,067,177 A | * | 12/1962 | Greco et al. ................ | 524/598 |
| 3,112,343 A | * | 11/1963 | Allgeuer et al. ............... | 564/3 |
| 3,290,371 A | * | 12/1966 | Brooke et al. ............... | 427/212 |
| 3,299,132 A | | 1/1967 | Dougherty | |
| 3,544,297 A | | 12/1970 | Passmore | |
| 4,160,782 A | * | 7/1979 | Van Hijfte et al. ............. | 564/3 |
| 4,204,053 A | * | 5/1980 | Elstrom et al. ............. | 528/259 |
| 4,597,884 A | | 7/1986 | Greenwald .................... | 252/70 |
| 5,482,639 A | | 1/1996 | Archer et al. | |

FOREIGN PATENT DOCUMENTS

| | | |
|---|---|---|
| CA | 1146973 | 5/1983 |
| DE | 2139278 | 2/1972 |
| DE | 2825039 | 12/1978 |
| GB | 1334871 | 10/1973 |
| IE | 46841 | 10/1983 |
| WO | 9521689 | 8/1995 |

OTHER PUBLICATIONS

Derwent Patent Abstract No. 1983-849239, abstract of Soviet Union Patent Specification No. 998446A (Feb. 1983).*
Derwent Patent Abstract No. 1990-199555, abstract of Soviet Union Patent Specification No. 1507761A (Sep. 1989).*
Derwent Patent Abstract No. 1987-155231, abstract of Romanian Patent Specification No. 90737A (Nov. 1986).*

* cited by examiner

*Primary Examiner*—Anthony J. Green
(74) *Attorney, Agent, or Firm*—Baker Botts LLP

(57) ABSTRACT

A urea based granule blend configured for ice-melting and reducing granule caking, the blend comprising substantially pure urea granules comprising an ice-melting property and formaldehyde coated urea granules configured for reducing granule caking, wherein the blend is configured for ice-melting when in use and reducing granule caking when in storage.

18 Claims, No Drawings

UREA BASED GRANULE BLEND FOR ICE-MELTING AND REDUCING GRANULE CAKING

FIELD OF THE INVENTION

The present invention relates to a urea based granule blend configured for ice-melting when in use and reducing granule caking when in storage.

BACKGROUND TO THE INVENTION

Urea (also termed carbamide) is the chief nitrogen containing end product of the animal protein metabolism in addition to being synthesised on a large scale for use as a fertiliser and as a raw material in the manufacture of urea based plastics. Further applications of urea include use in the manufacture of drugs and importantly here for melting ice on runways, driveways, paths and the like.

When used within fertilisers and de-icing compositions it is know to store and dispense urea in the form of granules, including specifically prills, such granules or prills being dispensed onto an agricultural field or iced road via a mechanical spreading device such a device commonly being towed by a vehicle.

A first problem associated with the use of urea based granules is their tendency to cake (the sticking together of neighbouring granules) resulting in a large mass of undispensable urea. Caking of urea granules is particularly acute when stored in a humid environment, water being the contributor to the observed caking phenomenon. Within the art there are various attempts to solve the problem of urea granules caking, for example U.S. Pat. No. 3,299,132 discloses a process of tumbling a bed of urea within a pre-set temperature range for a pre-set time. Effectively, the urea granules are baked so as to provide a hardened outer surface, the resulting granules exhibiting reduced caking tendency. WO 95/21689 discloses a method for producing a free-flowing or non-caking granule urea in the presence of a conditioning agent. The conditioning agent being a diralent metal oxide such as calcium oxide, magnesium oxide or zinc oxide. Further additions include the use of a granulating aid being a trivalent metal salt such as aluminum or ferric sulphate. Further, U.S. Pat. No. 3,544,297 discloses an anti-caking treatment for urea using polymerised resins. The method disclosed uses a finely divided plastic material of a thermal-setting or thermal-plastic type added to the urea granules. The plastic material provides abrasive entities inter-dispersed within the urea granules so as to break down and/or prevent caking. CA 1,146,973 identifies various attempts to reduce caking including the addition of aqueous formaldehyde solution or of aqueous formaldehyde-urea condensates such as di-and trimethylol urea as disclosed in DE-OS 2,139,278 and DE-OS 2,825,039. However, use of formaldehyde solutions is in itself unsatisfactory as the production of urea granules involves the removal of water, water being present within the formaldehyde solutions. CA 1,146,973 according to its primary teaching discloses a method of treatment of urea granules by various additives including dicyandiamide so as to prevent granule caking.

A second problem associated with the treatment of urea granules so as to reduce granule caking when in storage is the reduction of the granules ice-melting property when in use. For example, of the prior art identified above U.S. Pat. No. 3,544,297, WO 95/21689 and CA 1,146,973 provide additives to or methods of treatment of granule urea for use in fertilisers to prevent granule caking in storage. The inventors have found that such prior art additives to or treatments of urea granules in order to reduce caking, being specific to the use of granule urea for fertilisers, reduces the ice-melting property of the urea granules below an exceptable effective level in order to de-ice a road, driveway, path or the like. Conversely, prior art associated with the ice-melting application of urea are directed to improving the ice-melting property whilst not addressing the problem of granule caking during storage, U.S. Pat. No. 5,482,639 being such an example.

A third problem associated with prior fertiliser specific anti-caking disclosures is the corrosive nature of the treated urea or the depositing of unwanted residues following the de-icing process. Moreover, the deposition of corrosive compounds following the ice-melting process is also common to prior art methods of urea based ice-melting formulations as disclose in U.S. Pat. No. 5,482,639.

What is required therefore is a urea based granule blend configured with enhanced ice-melting property when in use whilst retaining reducing granule caking properties when in storage. Further, there is a need for such a granule blend having said properties which is non-corrosive and does not deposit unwanted additives following ice-melting.

SUMMARY OF THE INVENTION

On realising the problems associated with prior art urea based de-icing methods and formulations the inventors provide a urea based granule blend configured for ice-melting when in use whilst having a reduced caking tendency when in storage. Further, a urea based granule blend is provided which is non-corrosive without the deposition of unwanted blend composites released during or after the ice-melting process.

According to a first aspect of the present invention is provide a urea based granule blend configured for ice-melting and reducing granule caking, said blend comprising:

substantially pure urea granules comprising an ice-melting property; and formaldehyde coated urea granules configured for reducing granule caking;

wherein said blend is configured for said ice-melting when in use and reducing granule caking when in storage.

According to a second aspect of the present invention there is provided a method of preparing a urea based granule blend configured for ice-melting and reducing granule caking, said method comprising:

mixing substantially pure urea granules comprising an ice-melting property with formaldehyde coated urea granules configured for reducing granule caking;

wherein said blend is configured for said ice-melting when in use and reducing granule caking when in storage.

According to a third aspect of the present invention there is provided a method of ice-melting using a urea based granule blend, said method comprising:

mixing substantially pure urea granules comprising an ice-melting property with formaldehyde coated urea granules;

reducing a caking of said granules using said formaldehyde coated urea granules;

initiating said ice-melting using said substantially pure urea granules; and activating said formaldehyde coated urea granules for ice-melting following said initiating of said ice-melting using said substantially pure urea granules.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Within this specification the term "substantially pure urea granules" includes pure urea granules and urea granules containing slight or trace amounts of impurities formed or retained within the granules during manufacture.

Within this specification the term "formaldehyde coated urea granules" includes urea granules containing formaldehyde, such formaldehyde being present to a large extent on the surface of the granules. This term also includes the coating of urea granules with gaseous formaldehyde and formaldehyde solution both treatments involving a degree of formaldehyde penetration within the granules.

The inventors provide an improved urea based formulation or blend, over those disclosed in the art, having enhanced ice-melting property, being comparable with pure urea whilst having reduced granule caking tendency by utilising a blend composition comprising a ratio of mixed substantially pure urea granules with treated urea granules. The inventors have found that by utilisation of formaldehyde coated urea granules or more generally formaldehyde containing urea granules, a reduced granule caking is observed during storage of the urea based blend. The benefits of using formaldehyde treated urea granules include:

- A reduced granule caking during storage resulting ultimately in a free flowing ice-melting urea based granule formulation supplied to the intended area.
- The deposition of unwanted deposits or hazardous chemicals is avoided through utilisation of the blend compositions specific to the present invention disclosed herein.

According to the specific implementation of the present invention substantially pure urea granules are mixed with formaldehyde containing, being preferably coated, urea granules, the resultant blend being configured for ice-melting and reducing caking. The urea based granules coated with formaldehyde also comprise an ice-melting property being less than the ice-melting property of the substantially pure urea granules, the activity observed by the inventors indicating the substantially pure urea granules initiate ice-melting which in turn activates the ice-melting property of the formaldehyde coated urea granules.

According to the specific implementation of the present invention substantially pure urea granules are simply mixed with formaldehyde coated urea granules in that the stored and dispensed granule blend comprises an inter-disbursed even mixture of both types of granules, such that all granules are either in direct or indirect contact with one another. The granule blend may then be configured for storage within a hand-held dispenser, a user of such a dispenser being able to dispense the granule blend from a suitable dispensing port or ports. Due to the free flowing action of the granule blend, by way of example, a shaking of the dispenser is sufficient to allow a dispensing of the urea based blend onto the desired area, such as roads or paths or steps or drives.

Through the utilisation of a urea based granule blend the inventors provide an ice-melting formulation with reduced granule caking tendency such that a ratio of the substantially pure urea granules to formaldehyde coated urea granules is adjustable so as to provide a formaldehyde coated urea granules rich blend optimised for substantially reducing granule caking during storage of the granule blend. Such a blend ratio would be advantageous in particularly humid environments where the air is saturated with moisture and considrable granule caking would otherwise be observed.

Conversely, the ratio of substantially pure urea granules to formaldehyde coated urea granules may be adjusted to provide a substantially pure urea granules rich blend being optimised for ice-melting. Such a blend configuration would be advantageous in a particularly cold environment where substantial ice-melting is required.

According to the specific implementation of the present invention the blend ratio is 1:1, substantially pure urea granules to formaldehyde coated urea granules.

Preferably, the urea based granules are formed as prills being of a suitable length and diameter to allow ease of dispensing from a hand-held dispenser onto roads, paths, steps or drives. Further specific implementations of the present invention are configurable for use in commercial or industrial applications involving a variety of prill length and diameters.

Through the specific blend of urea based granules according to the present invention the free flowing nature of the ice-melting composition provides for a dispensing of the granule blend without requirement of a mechanical granule dispensing device being, for example a hopper or mechanical spreading device towed behind a vehicle.

According to the specific implementation of the present invention the urea based granule blend may be prepared being configured for ice-melting and reducing granule caking comprising mixing substantially pure urea granules comprising an ice-melting property with the formaldehyde coated urea granules configured for reducing granule caking. The granule blend is then configurable for storage in a hand-held dispenser being, by way of example, a canister, tube, tub, shaker or flask provided with at least one suitable dispensing orifice to allow the free flowing substantially pure urea granules plus formaldehyde coated urea granules to be dispensed onto the appropriate area.

When in use, the substantially pure urea granules initiate the ice-melting owing to their enhanced ice-melting capacity over that of the formaldehyde coated urea granules. On melting the ice water is produced which acts to solvate the formaldehyde from the formaldehyde coated urea granules thereby activating the formaldehyde coated urea granules for ice-melting following this initiating of the ice-melting using the substantially pure urea granule. A conversion of formaldehyde coated urea granules to substantially pure urea granules is then observed the newly generated substantially pure urea granules being configured for ice-melting.

The substantially pure urea granules can be said to catalyse the ice-melting by the formaldehyde coated urea granules, in that substantially pure urea granules are generated following an initial ice-melting.

The invention claimed is:

1. A urea based granule blend configured for ice-melting and reducing granule caking, said blend comprising:
   substantially pure urea granules capable of melting ice; and
   formaldehyde coated urea granules, the formaldehyde capable of reducing granule caking;

wherein said blend is capable of melting ice when in use and configured for reducing granule caking when in storage.

2. The granule blend as claimed in claim 1 wherein a ratio of said substantially pure urea granules to said formaldehyde coated urea granules is adjustable to provide a formaldehyde coated urea granules rich blend being optimised for substantially reducing granule caking during storage of said granule blend.

3. The granule blend as claimed in claim 1 wherein a ratio of said substantially pure urea granules to said formaldehyde coated urea granules is adjustable to provide a substantially pure urea granules rich blend being optimised for said ice-melting.

4. The granule blend as claimed in claim 1 wherein said granules are prills.

5. A method of preparing a urea based granule blend configured for ice-melting and reducing granule caking, said method comprising:
   mixing substantially pure urea granules capable of melting ice with formaldehyde coated urea granules, the formaldehyde capable of reducing granule caking;
   wherein said blend is capable of melting ice when in use and configured for reducing granule caking when in storage.

6. The method as claimed in claim 5 further comprising:
   storing said granule blend in a hand-held dispenser configured to dispense said granule blend.

7. The method as claimed in claim 5 wherein said granules are prills.

8. The method as claimed in claim 5 wherein said granule blend comprises a greater amount of formaldehyde coated urea granules relative to an amount of said substantially pure urea granules.

9. The method as claimed in claim 5 wherein said granule blend comprises a greater amount of substantially pure urea granules relative to an amount of said formaldehyde coated urea granules.

10. A method of ice-melting using a urea based granule blend, said method comprising:
    mixing substantially pure urea granules capable of melting ice with formaldehyde coated urea granule, said formaldehyde capable of reducing a caking of said granule blend;
    wherein, when said granule blend is applied in contact with ice, melting of said ice is initiated by said substantially pure urea granules the melted ice capable of solvating the formaldehyde and activating said formaldehyde coated urea granules for ice-melting.

11. The method as claimed claim 10 wherein a ratio of said substantially pure urea granules to said formaldehyde coated urea granules is adjustable to provide a substantially pure urea granule rich granule blend being optimised for said ice-melting.

12. The method as claimed in claim 10 wherein a ratio of said substantially pure urea granules to said formaldehyde coated urea granules is adjustable to provide a formaldehyde coated urea granule rich granule blend being optimised for reducing granule caking during storage of said granule blend.

13. The method as claimed in claim 10 wherein said granules are prills.

14. The method as claimed in claim 10 further comprising:
    applying said granule blend to said ice as a free-flowing granule blend from a dispenser.

15. The method as claimed in claim 14 wherein said dispenser is a hand-held dispenser, wherein despensing said granule blend from said dispenser comprises:
    a user shaking said hand-held dispenser.

16. A hand-held dispenser being configured to dispense a urea based granule blend configured for ice-melting and reducing granule caking, said blend comprising:
    substantially pure urea granules capable of melting ice; and
    formaldehyde coated urea granules, the formaldehyde capable of reducing granule caking;
    wherein said blend is capable of melting ice when in use and configured for reducing granule caking when in storage.

17. The hand-held dispenser as claimed in claim 16 wherein said dispenser is configured to dispense said granule blend by a shaking of said dispenser by a user.

18. The hand-held dispenser as claimed in claim 16 wherein said dispenser is configured to dispense said granule blend as a free-flowing granule blend.

* * * * *

UNITED STATES PATENT AND TRADEMARK OFFICE
CERTIFICATE OF CORRECTION

PATENT NO. : 7,264,746 B2  Page 1 of 1
APPLICATION NO. : 10/686397
DATED : September 4, 2007
INVENTOR(S) : Sands et al.

It is certified that error appears in the above-identified patent and that said Letters Patent is hereby corrected as shown below:

ON THE TITLE PAGE:

Item (73) Assignee:

change "Batley" to --Leeds--

Signed and Sealed this

Nineteenth Day of August, 2008

JON W. DUDAS
*Director of the United States Patent and Trademark Office*